United States Patent [19]

Riethmuller et al.

[11] 3,800,236

[45] Mar. 26, 1974

[54] CIRCUIT ARRANGEMENT FOR BASE LINE COMPENSATION

[75] Inventors: Lothar Riethmuller, Oberuhldingen; Hans W. Kiefer; Ernst Spreitzhofer, both of Nubdorf, all of Germany

[73] Assignee: Bodenseewerk Perkin - Elmer & Co. GmbH, Bodensee, Germany

[22] Filed: Feb. 7, 1973

[21] Appl. No.: 330,218

[30] Foreign Application Priority Data

Feb. 8, 1972 Germany .......................... 2205793

[52] U.S. Cl. .................... 328/162, 328/37, 328/150, 328/168, 328/71, 328/41

[51] Int. Cl. ............................................ H03k 5/00

[58] Field of Search ......... 328/37, 71, 41, 162, 168, 328/150

[56] References Cited

UNITED STATES PATENTS

| | | | |
|---|---|---|---|
| 3,137,818 | 6/1964 | Clapper | 328/37 X |
| 3,605,026 | 9/1971 | Bowden | 328/37 X |
| 3,648,180 | 3/1972 | Woodcock | 328/37 X |
| 3,670,151 | 6/1972 | Lindsey | 328/37 X |

*Primary Examiner*—John S. Heyman
*Attorney, Agent, or Firm*—Daniel R. Levinson

[57] ABSTRACT

A circuit arrangement for compensating an input signal (of the type comprising successive peaks) relative to a drifting base line comprises: a peak detector including an integrator which integrates the signal variation over successive short measuring intervals and is resettable to zero after each measuring interval and further including a comparator for comparing the integrator output with a reference level and supplying a peak recognition signal when the integrator value exceeds the reference level during a measuring interval; a counter into which pulses can be counted proportional to the deviation of the input signal from zero; a digital-to-analog converter by which the counter reading is converted to an analog correction signal which is algebraically added to the input signal for zero line compensation; and means for controlling the counting action in dependence of the peak recognition such that upon occurrence of a peak recognition signal, the zero line compensation is stopped. The present improvement comprises: connecting the counter to a storage device to which the counter reading is transferred at the end of each measuring interval when the peak detector has not yet recognized a peak, and retransferring back to the counter the contents of the storage device (corresponding to the next to last measuring interval) upon the subsequent occurrence of a peak recognition signal. This effects base line compensation relative to the next to last previous counter value, so as to avoid systematic error which may otherwise be caused by failure to recognize the beginning of a peak in the immediately last previous interval to the one in which the peak signal value was sufficient to be determined by the peak detector.

1 Claim, 2 Drawing Figures

CIRCUIT ARRANGEMENT FOR BASE LINE COMPENSATION

Figure 1:
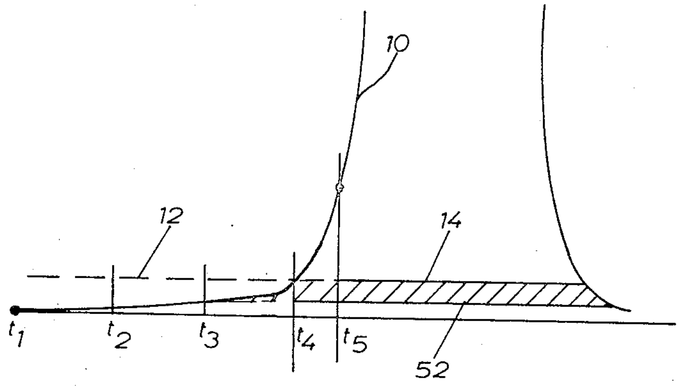

This invention relates to a circuit arrangement for compensating or balancing a drifting base line (zero line) of an input signal to be measured, which input signal consists of successive peaks, comprising: a peak detector including an integrator which integrates the signal variation over successive short measuring intervals and is resettable to zero after each measuring interval, and further including a comparator by which the integrator output is compared with a particular reference signal and which supplies a peak recognition signal when the integrator output exceeds the reference signal during a measuring interval, a counter into which pulses can be counted upon a deviation of the input signal from zero, a digital-to-analog converter by which the counter reading can be converted to an analog correction signal which is algebraically added to (i.e., subtracted from) the input signal for zero line correction or compensation, and means for controlling the counting action in dependence on the peak recognition signal of the peak detector such that upon determination of the existence of a peak in the input signal the zero line compensation or balancing is stopped.

A peak detector of this general type is known, in which an input signal is applied to a summing amplifier which is connected to a Miller-integrator. The output of the Miller-integrator on the one hand controls a first threshold value switch (or pair of switches) whose output is applied to an input of a first (pair of) AND-element. A clock supplying timing signals determining repetitive measuring intervals is applied to the second input of the first (pair of) AND-element. The output of the AND-element is applied to an input of a second AND-element to whose other input counting pulses of a fixed pulse frequency are applied. The output of this second AND-element is connected to the input of a digital counter. The outputs of the individual counter stages of the digital counter control a digital-to-analog converter which generates an analog correction signal. This correction signal is applied to the input of the summing amplifier and is thus superimposed on (in negative feedback relation, so as to be subtracted from) the measuring signal. The clock pulses at the first AND-element effect a zero balancing at the input of the summing amplifier at the beginning of each measuring interval, so that the integrator effectively integrates the signal variations occurring in each single measuring interval. A second threshold value (pair of) switch is connected to the output of the integrator. This is a comparator which compares the output signal of the integrator with a different fixed reference signal. If the output signal of the integrator exceeds this higher threshold value, namely, the reference signal during a measuring interval, then the threshold value switch supplies a peak recognition signal which is supplied to an analyzer logic circuit and, for instance, initiates the peak integration and interrupts the zero line compensating or balancing for the signal being integrated (See German published application 1,903,698 corresponding to U.S. Pat. No. 3,634,770 issued on Jan. 11, 1972).

Moreover, a circuit arrangement for the zero line correction in a peak integrator is also known prior art (French Pat. No. 1,448,815), in which for zero line correction the input signal voltage is converted by means of a voltage-to-frequency converter to a pulse frequency controlling a counter. The counter reading is transferred between the measuring intervals periodically to a storage device via a gate, the gate being controlled by a clock generator and a peak detector. The storage device includes a digital-to-analog converter which superimposes a correcting voltage on the input signal voltage applied. In this manner the zero line is controlled by the clock generator and corrected respectively at the end of equal measuring time intervals unless the peak detector determines the occurrence of a peak at the end of one of the measuring time intervals (in which case the compensation of the zero or base line stops).

In this type of prior art arrangement a zero balancing is effected until the peak detector signals the occurrence of a peak. If in such a circuit arrangement for zero line balancing, a peak detector is used in which the time integral of the signal variation in the individual measuring intervals is compared with a threshold value, as is, for instance, prior art by the above-mentioned German published application 1,903,698 corresponding to U.S. Pat. No. 3,634,770, this can lead to errors. Namely, if in a measuring interval (which for increase in sensitivity and for suppression of interfering influences, e.g. noise, should be selected as long as possible), a signal rise occurs which, however, does not yet quite reach the threshold value, then this signal rise will be compensated at the end of the measuring interval by the zero balancing and the peak will be recognized only in the next measuring interval if the signal rise then exceeds the threshold value. Then not only is the peak integration initiated one scanning interval too late (which involves an error), but a considerably greater error is encountered in that the signal rise was compensated in the preceding scanning interval and thus the integrated signal is falsified (reduced, by being not recorded) by this amount (i.e., ordinate value) over the total width (abscissa range) of the peak.

It is an object of this invention to so devise a circuit arrangement for balancing the zero line comprising: a peak integrator integrating over measuring intervals, a counter to which counting pulses are applied upon a deviation of the input signal from the zero line, a digital-to-analog converter for generating a correction signal for the zero line balancing, and means for interrupting the zero line balancing when a peak recognition signal occurs in the peak detector, that a falsification of the measurement and in particular of the integration due to an erroneous zero line balancing in the measuring interval at the base of the peak is avoided.

According to the intention this object is attained by providing that the counter has connected thereto a storage device to which is transferable the counter reading at the end of each measuring interval, and that by the peak recognition signal the storage content corresponding to the zero line balancing in the last scanning interval but one (i.e., the next to last previous interval) is re-transferable to the counter, and this level is used as the compensated zero or base line during the peak integration that follows.

Thus, if in a measuring interval a rise of the input signal is determined which is above the threshold value, thus, signaling the occurrence of a peak, then the zero-line balancing preceding this measuring interval will be "undone." Thus, the signal is not related to the zero line balanced in the last measuring interval prior to the peak recognizing measuring interval, but to the zero line to which the signal had been balanced in the interval previous to that one (i.e., the next to last previous measuring interval).

An illustrative embodiment of this invention will now be described more fully with reference to the accompanying drawings in which:

FIG. 1 is a diagrammatic representation of the signal waveform at the beginning of a peak, illustrating the invention.

Figure 2:
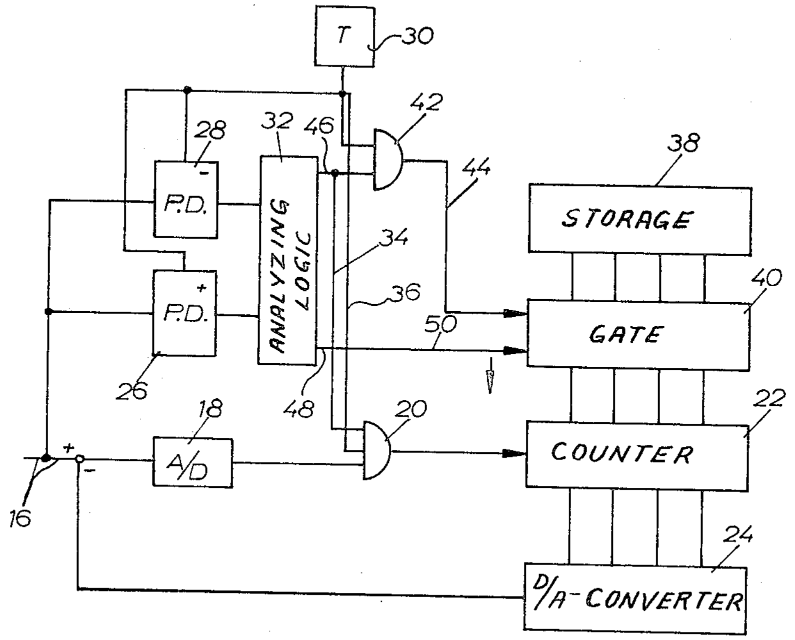

FIG. 2 is a schematic circuit diagram of a circuit arrangement for zero line balancing, incorporating the invention. In FIG. 1 reference characters $t_1, t_2, \ldots t_5$ designate the beginning and end respectively of the individual measuring intervals. At the end of each interval (thus, for instance, for the interval from $t_1$ to $t_2$ at point $t_2$), a peak detector determines whether or not the time integral of the signal variation exceeds a preset threshold value over the measuring interval (from $t_1$ to $t_2$). If this is not the case, a zero or base line balancing compensating or correcting will be effected. The same effect is repeated in the time interval from $t_2$ to $t_3$ and from $t_3$ to $t_4$, assuming that, although in the time interval from $t_3$ to $t_4$ a signal rise already takes place, involving the beginning of an actual signal peak 10, this signal rise, however, is not sufficient to reach the threshold value of the peak detector. In this case also at point $t_4$ a zero line balancing would take place (i.e., the actual signal peak 10 which would be recognized by the end of the next following measuring interval at the point $t_5$, would be related to the incorrect zero line 12 (at point $t_4$) shown in dashed lines). Thereby, an error would occur in the measurement of the signal peak corresponding to the signal rise in the scanning interval from $t_3$ to $t_4$. In the integration of the peak (for instance, in the evaluation of the detector signals of a gas chromatograph), not only the very beginning of the peak in the interval $t_3$ to $t_4$ would not be counted so as to provide an initial error, but also an error which corresponds to the area 14 shown by hatching would also not be counted (integrated) by the input signal measuring part of the circuit.

This error is avoided by the present invention as exemplified by the FIG. 2 circuit. The input signal to be measured is applied to an input 16. For zero line balancing an analog-to-digital converter 18 is provided which converts the input signal to a pulse frequency proportional thereto. These pulses are counted into a counter 22 via an AND-element 20 which is open (i.e., conducting) in the absence of an actual peak. The counter reading is converted by a digital-to-analog converter 24 to an analog correction signal which is is algebraically added in feedback relation to (i.e., subtracted from) the input signal for zero line compensating or balancing. The input signal thus compensated or corrected is applied to two peak detectors 26 and 28 for positive and negative slope, respectively.

The peak detectors operate in known manner such that they first integrate the variation of the measuring signal in time over preset measuring intervals $t_1$, $t_2$, $t_3$, etc. and compare each of these integrated signals with a reference signal. A peak recognition signal will be supplied if during a measuring interval the integrated signal variation exceeds the value of a fixed reference signal. If this happens, or at the end of a given clock period the integrator of the peak detectors 26 and 28 are reset to zero and a new measuring interval begins. Because a peak recognition signal resets the detectors, the measuring interval between $t_4$ and $t_5$ is shorter than the "normal intervals" between $t_1$ and $t_2$, between $t_2$ and $t_3$, and between $t_3$ and $t_4$. The normal measuring intervals are determined by a timer or clock pulse generator 30.

The peak recognition signals from the peak detectors 26 and 28 are supplied to an analyzer logic circuit 32. When a peak occurs, the analyzer logic circuit 32 blocks the counting of the counting pulses from the analog-to-digital converter 48 into the counter 22 via lead 34 and the second input of the AND-gate 20 (by supplying a "O" logic signal when a peak is present). Thus, upon recognition of a peak further zero line correction or balancing via the digital-to-analog converter 24 is prevented, since AND gate 20 is now blocked (closed or non-conductive) which, controlled by the clock generator 30 via line 36 would otherwise become open (conducting) upon the occurrence at point $t_5$ at the end of the scanning interval from $t_4$ to $t_5$.

This however, would cause an incorrect comparison of the peak signal to the zero line 12 (FIG. 1) to which the input signal was balanced in the preceding scanning interval from $t_3$ to $t_4$. For this reason, a storage device 38 is provided, which is connected with the counter 22 via a gate 40. The gate 40 transfers the counter reading of the counter 22 to a storage device 38 at the end of each normal measuring interval as long as the peak detectors do not recognize any peak. This is accomplished by the clock generator 30 via an AND-element 42 and the line 44. To the second input of the AND-element the output 46 of the analyzer logic circuit 32 is applied which maintains the AND-element 42 as well as the AND-element 20 open (conducting) in the absence of a peak (since in the absence of a peak, the output 46 supplies a "1" logic signal).

If the peak detectors 26, 28 recognize a peak, then the AND-elements 20 and 42 will be blocked by (the occurrence of a "O" signal at) the output 46 of the analyzer logic circuit. Therefore, there is no further counting of counting pulses into the counter 22. Similarly, there is also no transfer of the counter reading to the storage device 38. The gate 40 is rather controlled via the second output 48 of the analyzer logic circuit by the lead 50 which may be a logically inverted signal relative to output 46 such that it now re-transfers the state (i.e., contents) of the storage device 38 to the counter 22. The counter thus assumes a counter reading which does not correspond to the zero line balancing at point $t_4$, but to the zero line balancing at point $t_3$. Thus, by the recognition of a peak in a measuring interval not only is a further zero line balancing at the end of this peak-recognizing measuring interval prevented, but the counter is reset to a reading which it had at the end of the next to last measuring interval, thus in FIG. 1 at the end of the measuring interval between $t_2$ and $t_3$ and which had been transferred at point $t_3$ to the storage device 38. Thereby, the error represented by the dashed lines 14 in the peak integration is avoided.

Thus, the following course of time is obtained: at the point $t_3$ a pulse number is counted into the counter, controlled by the clock generator 30 (through AND gate 20), which corresponds to the signal rise in the measuring interval $t_2$ to $t_3$. The signal rise from the measuring interval $t_1$ to $t_2$ previously stored in the counter 22 is shifted into the storage device 38. At the point of time $t_4$ the signal rise from the interval $t_2$ to $t_3$ is shifted from the counter 22 into the storage device 38 and the signal rise from the interval $t_1$ to $t_2$ stored there is cleared and therefore gets lost. The signal rise from the measuring interval $t_3$ to $t_4$ is counted into the counter 22. At the point of time $t_5$ a peak is recognized. However, the counter reading corresponding to the signal rise in the interval $t_3$ to $t_4$ is not supplied to the input through to D/A converter 24. Rather the value still contained in the storage device 38 from the interval $t_2$ to $t_3$ is now transferred to the counter 22 (and supplied through D/A converter 24 to input 16), so that a zero line corresponding to the line 52 (at point of time $t_3$) in FIG. 1 is obtained and utilized as the base line for integrating the value of peak 10. The actual integration of the peak may be accomplished by another circuit supplied by the now corrected input signal at point 16.

Although various elements, not essential to the present invention, of the above referred to U.S. letters Pat. 3,634,770 have not been illustrated in the simplified schematic of FIG. 2 herein, such elements or their equivalents would ordinarily be present. Thus in FIG. 1 of the patent drawings, the input (nonlinear) summing amplifier 12 has not been repeated in the instant FIG. 2. Similarly the integrator 18 of the patent has not been shown, and the elements 26 and 28 in the instant FIG. 2 are stated to include a resettable (to zero) integrating stage as well as separate trigger stages (analogous to those shown at 20, 22 in the patent). The analyzing logic circuit 32 in the instant FIG. 2 may be the same as logic circuit 24 in FIGS. 1 and 2 and include the elements (other than 20 and 22) shown in detail in FIG. 3 of the patent, so that output lead 46 in the instant FIG. 2 would correspond to output 100 in FIG. 3 of the patent (and output lead 48 herein would, as stated earlier, merely be the same output after logical "inversion"). The A/D converter 18 herein corresponds to the analogous element 28 in FIG. 1 of the patent, which in turn corresponds to elements 54–68 of FIG. 2 of the patent. The instant AND gate 20 and counter 22 shown (for the purpose of simplification) herein as a single AND gate and unidirectional counter would actually be a pair of AND gates (such as 58, 60 in the patent) and bidirectional counter (74 therein), with lead 36 herein corresponding to input 62 and lead 34 being a new additional control input to the AND gates (58, 60) of the patent. Finally, the digital-to-analog converter 24 herein may be constituted by elements 76, 78 in the patent (FIG. 2). It is emphasized that the above explanation of correspondence between elements of the instant, highly schematic FIG. 2 and the more detailed showing of FIGS. 1–3 of the referred to patent is given merely to explain how one exemplary embodiment of the instant invention may be made, and the instant invention is not limited to any such details of the referred to patent.

We claim:

1. In a circuit arrangement for compensating to zero the base line of an input signal consisting of successive peaks of the type comprising: a peak detector including an integrator which integrates the signal variation over each one of successive measuring intervals and is resettable to zero after each such interval, and further including a comparator for comparing the integrator output with a reference signal and which supplies a peak recognition signal when the integrator output value exceeds the reference signal during a measuring interval; a counter into which pulses can be counted which pulses are proportional to the deviation of the input signal from zero; a digital-to-analog converter by which the counter reading is converted to an analog correction signal which is algebraically added to the input signal for zero line compensation; and means for controlling the counting into said counter in dependence on the peak recognition signal of the peak detector such that upon occurrence of a peak recognition signal the zero line compensation is interrupted, the improvement comprising:

a gating means connected to said counter;

a storage means connected to said gating means;

said gating means being of such construction as to allow in a controllable manner either transfer of the contents of said counter into said storage means or the retransfer of the contents of said storage means into said counter;

means for causing said gating means to transfer from said counter the contents thereof to said storage means at the end of each measuring interval during the period that said peak detector determines there is no peak in said input signal, whereby said storage means contains during the next measuring interval the next to last determined count;

and means for causing said gating means to retransfer back to said counter such next to last determined count whenever the peak detector determines the existence of a peak in the next future measuring interval, whereby the compensation of said base line is effected relative to the next to last previous counter value, thereby avoiding systematic error caused by the failure to determine the beginning of a peak in the last previous interval to the one in which the peak value was sufficient to be determined by the peak detector.

* * * * *